United States Patent [19]

Blandford

[11] 4,447,217

[45] May 8, 1984

[54] COUPLING WITH OVERLOAD PROTECTION

[76] Inventor: Stephen Blandford, 24 Lawrence Rd., Marsh, Huddersfield, England

[21] Appl. No.: 263,799

[22] Filed: May 14, 1981

[30] Foreign Application Priority Data

May 16, 1980 [GB] United Kingdom ................ 8016195

[51] Int. Cl.³ .............................................. F16D 9/00
[52] U.S. Cl. ......................................... 464/32; 403/2
[58] Field of Search .................. 464/30, 32, 33; 403/2, 403/DIG. 3

[56] References Cited

U.S. PATENT DOCUMENTS

| | | | |
|---|---|---|---|
| 1,498,281 | 6/1924 | Jones | 464/33 |
| 2,446,133 | 7/1948 | Hawthorne | 464/32 |
| 2,962,880 | 12/1960 | May | 464/32 |
| 3,973,412 | 8/1976 | Miles | 464/33 |
| 3,975,923 | 8/1976 | Grimpe | 464/32 |
| 4,097,161 | 6/1978 | Weiss et al. | 464/32 X |

*Primary Examiner*—Stuart S. Levy
*Assistant Examiner*—Daniel P. Stodola
*Attorney, Agent, or Firm*—Gary M. Gron; Robert T. Ruff

[57] ABSTRACT

An overload protection coupling for limiting the torque transmitted between two elements of a rotating power transmission system comprises coaxial driving and driven members journalled for relative rotation. The members are drivingly connected to each other by one or more rod-like tensile breaking piece devices effective between first pairs of radial projections on the driving and driven members. One or more reaction devices are effective between second pairs of radial projections on the driving and driven members to ensure that the rod-like breaking piece devices are in pre-tension to a predetermined level approximately equivalent to the maximum torque transmitted by the coupling to increase fatigue life of the breaking piece devices. In some embodiments, the tensile breaking piece devices and reaction devices may be effective between just one pair of radial projections.

1 Claim, 11 Drawing Figures

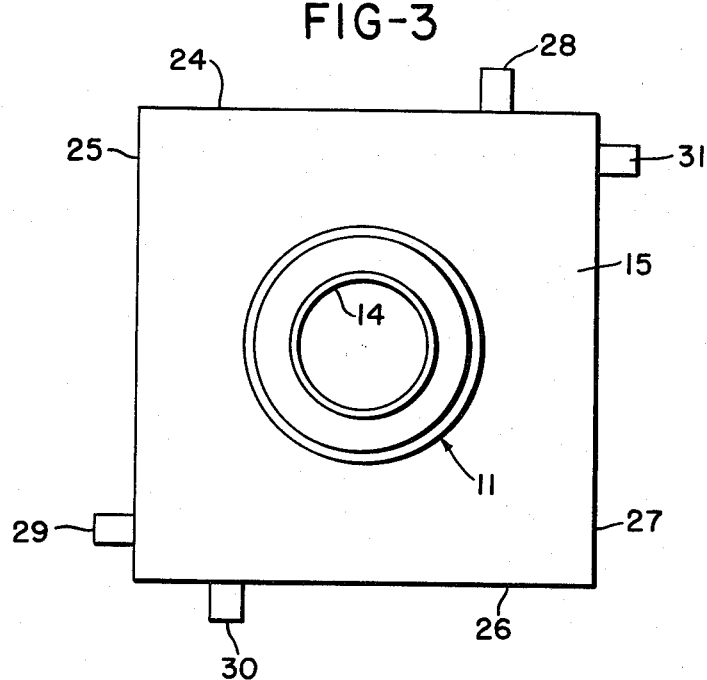
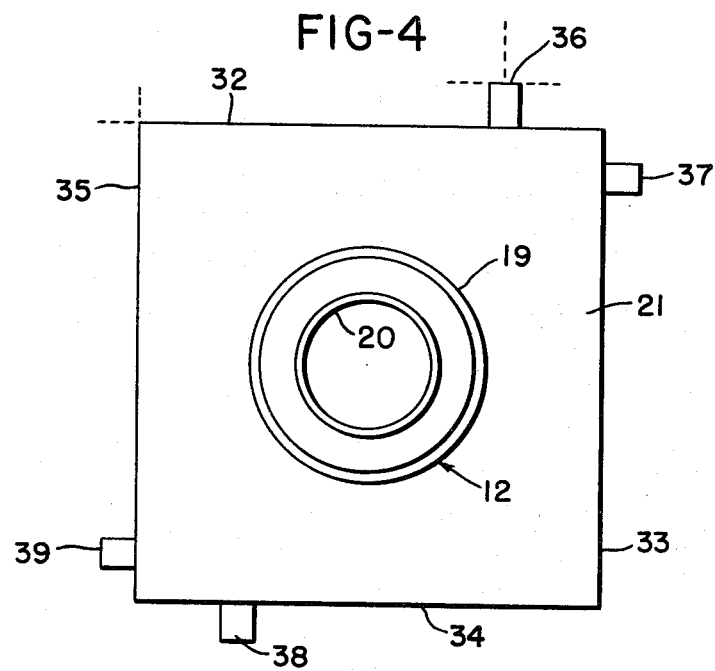

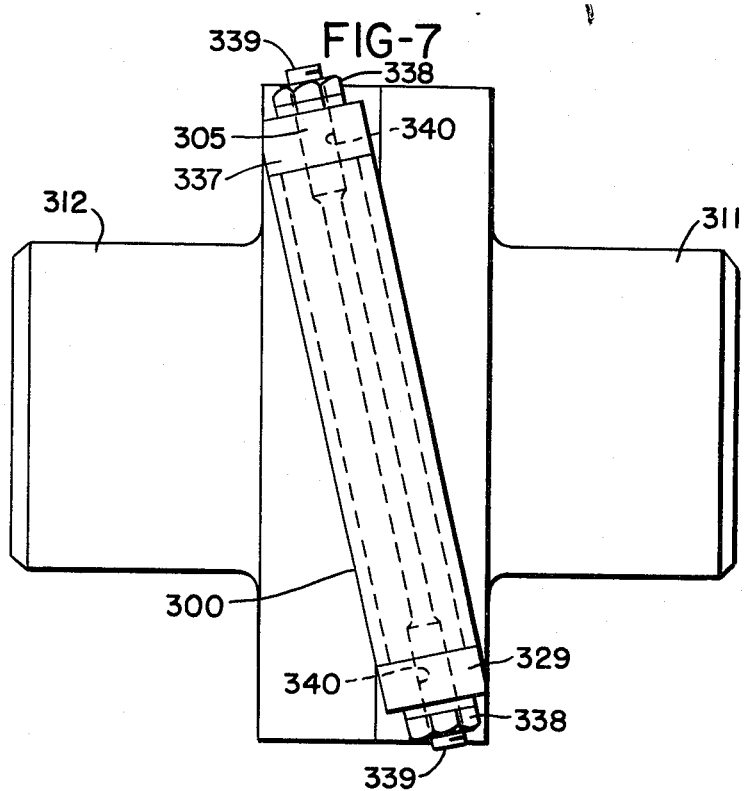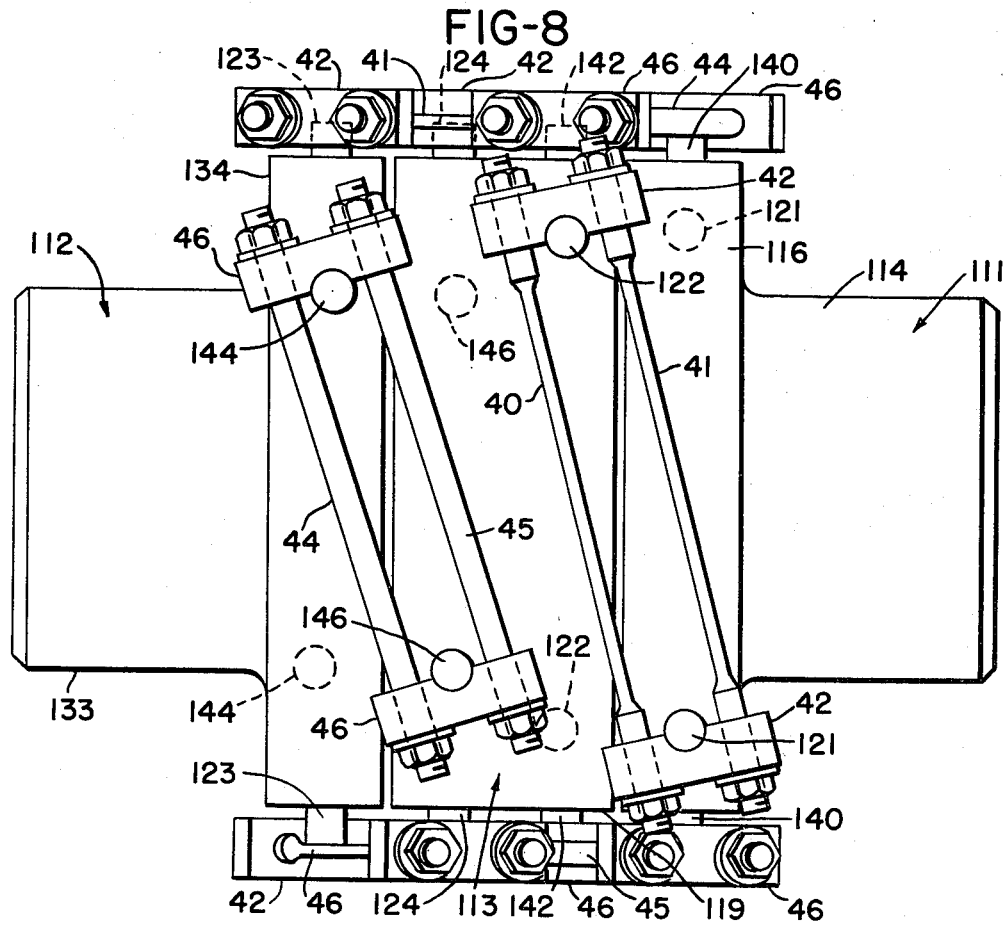

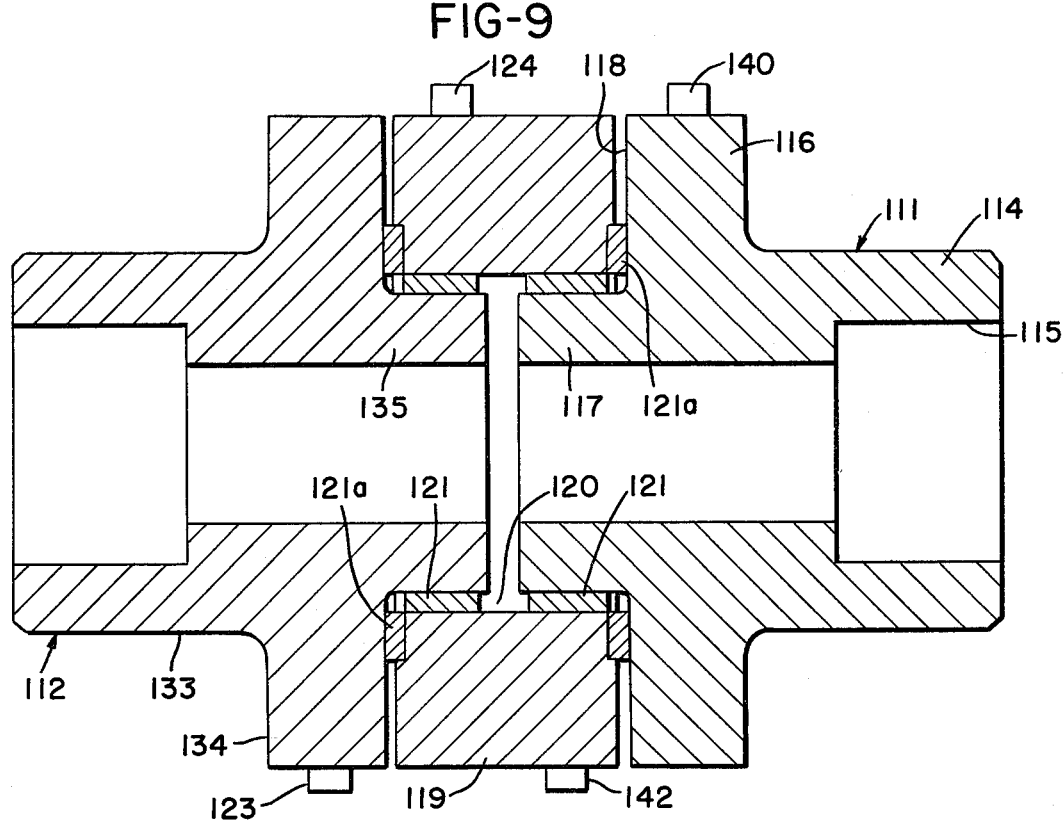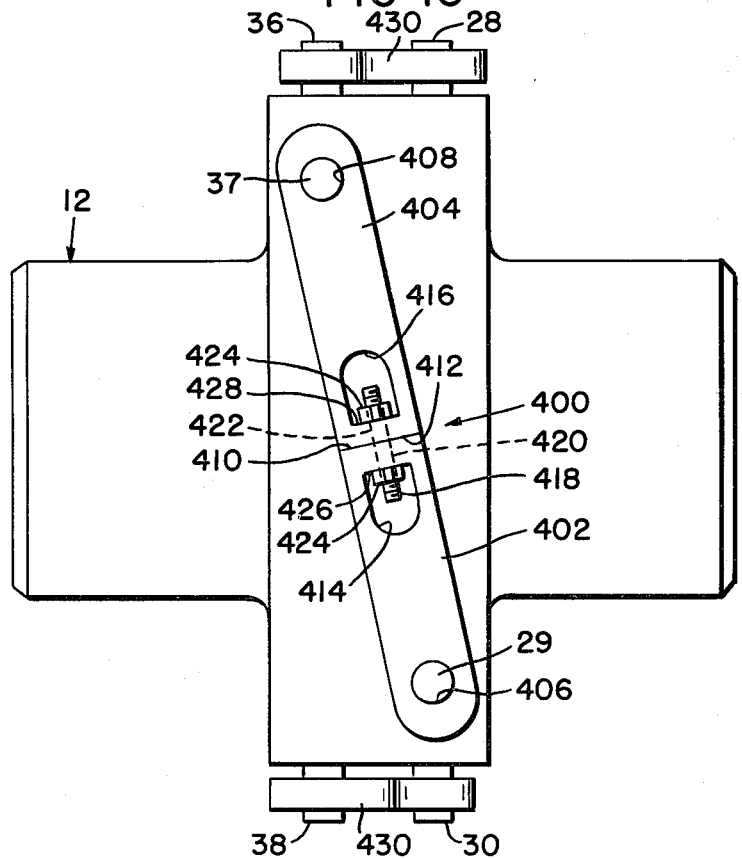

COUPLING WITH OVERLOAD PROTECTION

The present invention relates to overload protection devices and in particular to an overload protection coupling for controlling, to a predetermined maximum, the torque transmitted between two elements of a rotating power transmission system.

The use of overload protection devices used for transmitting torque between two elements of rotating machinery is well known. Frequently, such devices include a pin dimensioned (for example by notching) to shear when the torque transmitted between the two rotating machine elements imposes a predetermined shear stress on the pin. One such device is illustrated and described in British Pat. No. 1,520,416. More complex devices have also been used for overload protection between rotating machine elements. British Pat. No. 1,512,846 discloses such a device in which the driving and driven halves of the overload protection coupling have integral abutting semi-cylindrical radial extensions which form cylinders embraced by hardened steel rings. When the driving torque exceeds a set limit, the rings snap or break to protect the elements connected to the coupling.

A major disadvantage with such previous overload protection couplings is the difficulty in designing the breaking pieces so that they have an acceptably long working life when the coupling is installed in a power transmission system that is subject to torque fluctuations and possible torque reversal. Where the breaking pieces are designed to fail at a torque that is slightly above the maximum normal torque being transmitted by the coupling, the stress in the breaking pieces fluctuates in proportion to the torque fluctuation in the power transmission system from a value approaching the breaking stress of the breaking piece material down to zero stress, and in some instances, to a complete reversal of the direction of the stress. This repeated stress fluctuation drastically reduces the fatique life of the breaking piece which can fail when the coupling is transmitting a torque below its designed maximum value. If the breaking pieces are designed to fail at a torque that is considerably higher than the normal maximum torque transmitted by the coupling the fatique life of the breaking piece can be improved but this, however, necessitates that larger factors of safety be used throughout the power transmission system as a whole and hence the component parts become more expensive.

In accordance with the present invention the above problems are solved by an overload protection coupling for limiting the torque transmitted between two elements of a rotating power transmission system, comprising coaxial driving and driven members journalled for rotation relative to each other. The members are drivingly connected to each other by one or more tensile breaking piece devices, spaced around the periphery of the overload protection coupling, each device including at least one tensile breaking piece, and one or more devices for pre-tensioning the tensile breaking pieces up to a value at least equal to the tensile stress resulting from the force applied to the breaking piece by the maximum normal torque transmitted by the coupling.

The above and other related features of the present invention will be apparent from a reading of the following description of the disclosure shown in the accompanying drawings and the novelty thereof pointed out in the appended claims.

FIG. 3 is an end elevation of the coupling in the direction of arrow A in FIG. 1 without the breaking and loading pieces;

FIG. 4 is an end elevation of the coupling in the direction of arrow B in FIG. 1 without the breaking and loading pieces;

FIG. 7 is a side elevation of a third overload protection coupling illustrating another embodiment of the present invention;

FIG. 8 is a side elevation of a fourth overload protection coupling illustrating still another embodiment of the present invention; and FIG. 9 is a sectioned side elevation of the coupling of FIG. 8 with the breaking pieces and loading pieces removed;

FIG. 10 is a side elevation of still another overload protection coupling embodying the present invention.

Figure 1:
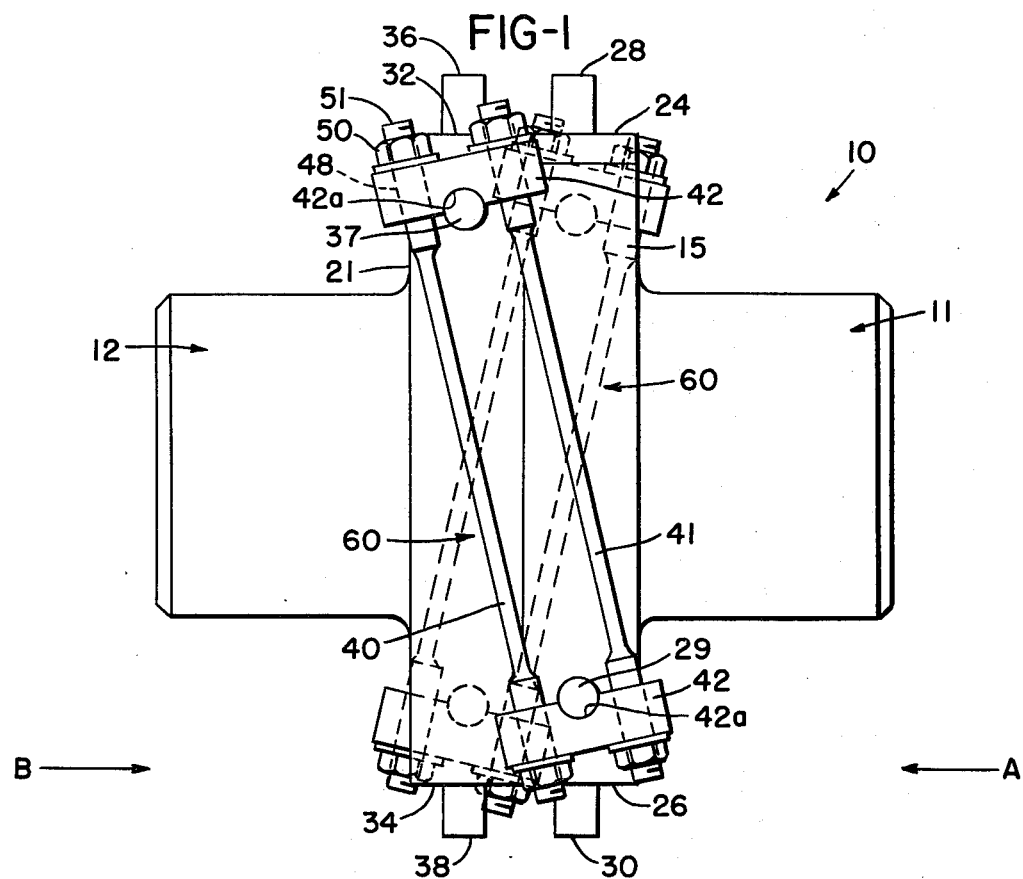
FIG. 1 is a side elevation of a first overload protection coupling embodying the present invention.
Figure 2:
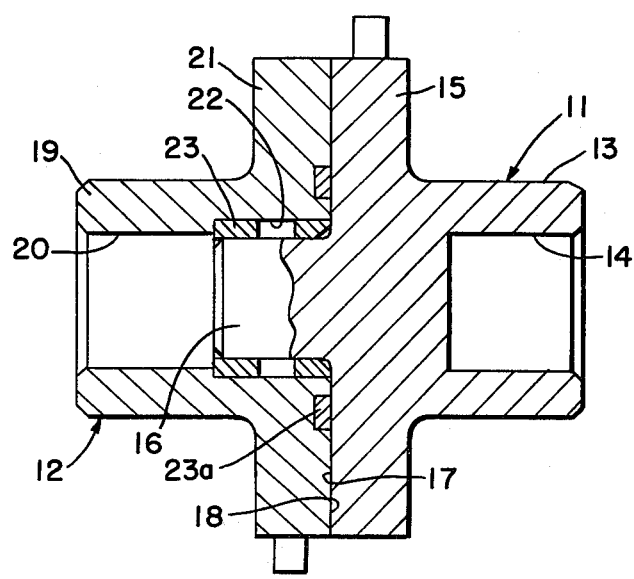
FIG. 2 is a sectioned side elevation of the coupling of FIG. 1 without the breaking and loading pieces.

Referring now to FIGS. 1 to 5 of the drawings, in which like elements are given like reference numerals, an overload protection coupling is generally designated 10 and comprises a driving member 11 and a driven member 12. The driving member 11 comprises a hub portion 13 having a bore 14 for connection to a driving shaft (not shown). A rectangular flange 15 is co-axial and integral with the hub portion 13 and a cylindrical portion 16 is coaxial with and projects from face 17 of the rectangular flange 15.

The driven member 12 comprises a hub portion 19 having a bore 20 for connection to a driven shaft (not shown), and a rectangular flange 21 coaxial and integral with the hub portion 19. The driven member includes a bore 22 provided with bearings 23 which cooperate with the cylindrical extension 16 of the driving member to provide journal bearing support for relative rotation between the driving member 11 and the driven member 12. Thrust bearings 23a may additionally be provided between the opposing faces 17 and 18 of the two coupling members.

The rectangular flange 15 of the driving member 11 and the rectangular flange 21 of the driven member 12 are similarly sized and arranged so that the peripheral faces of one are coplanar with the peripheral faces of the other. It should be noted, however, that the flanges 15, 21 may be provided in a form other than rectangular and still enable the beneficial qualities of the present invention.

The peripheral faces 24, 25, 26, 27 of the flange 15 (FIG. 3) are provided with cylindrical projections 28, 29, 30, 31 spaced as illustrated. Similarly, the peripheral faces 32, 33, 34, 35 of rectangular flange 21 are provided with cylindrical projections 36, 37, 38, 39 (FIG. 4). The projections may be machined integrally with the flanges 15 and 21 or may be separate pieces attached by force fitting or other means into suitably sized holes in the peripheral flange faces.

The driving connection between the driving member 11 and driven member 12 is provided by two pairs of tensile breaking piece devices 60. In one device 60, a pair of tensile breaking pieces 40, 41 (FIG. 1) connects, by means of arcuate recesses 42a in bridge pieces 42, projection 29 on face 25 of rectangular flange 15 to projection 37 on face 33 of rectangular flange 21. Projections 31 and 39 on faces 27 and 35 respectively are similarly connected by a second pair of tensile breaking pieces on the other tensile breaking piece device 60. The breaking pieces are fixed in position by passing threaded ends 51 of each tensile breaking piece through suitably sized holes 48 in the bridge pieces 42 and locking them in position with nuts 50.

Figure 5:
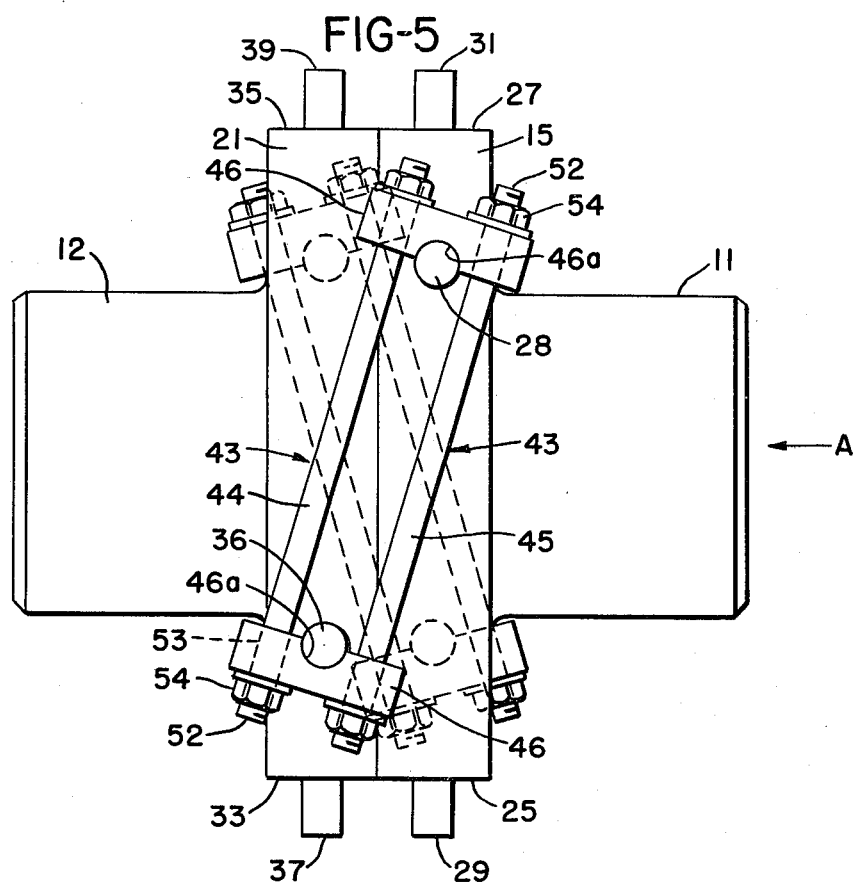
FIG. 5 is a plan view of the coupling of FIG. 1.

Spaced alternately with the tensile breaking piece devices 60 are a pair of reaction devices 43 (FIG. 5). In one device 43, a pair of tensile reaction members 44, 45 connect, by means of arcuate recesses 46a in bridge pieces 46, projections 28, 36 on faces 24,32 respectively of rectangular flanges 15 and 21 respectively. Similarly, projections 30, 38 on faces 26, 34 are connected by a second pair of reaction members in the other reaction device 43. The reaction members 43 are similarly fixed in position by passing threaded ends 52 of each tensile reaction member through suitably sized holes 53 in the bridge pieces 46 and locking them in position with nuts 54.

In the coupling illustrated in FIGS. 1 to 5 the tensile breaking pieces are arranged relative to the rectangular flanges so that flange 15 is urged in a clockwise direction relative to flange 21 as viewed in the direction of arrow A in FIG. 1. The reaction members are positioned to urge flange 15 in an anti-clockwise direction relative to flange 21 as viewed in the direction of arrow A of FIG. 5. The reaction members, spaced alternatively with the tensile breaking pieces around the periphery of the coupling, are therefore loaded in tension to provide the means for pretensioning the tensile breaking pieces. Although the tensile breaking pieces and corresponding reaction members are shown in sets of two on alternating faces of the rectangular flanges 15, 21 it should be apparent that they be employed in different numbers of sets.

The above design of tensile reaction member, may, however, be readily replaced by a compression reaction member located between any two projections connected by a pair of tensile breaking pieces and loaded in compression to provide the means of pre-tensioning the tensile breaking pieces.

Figure 6:
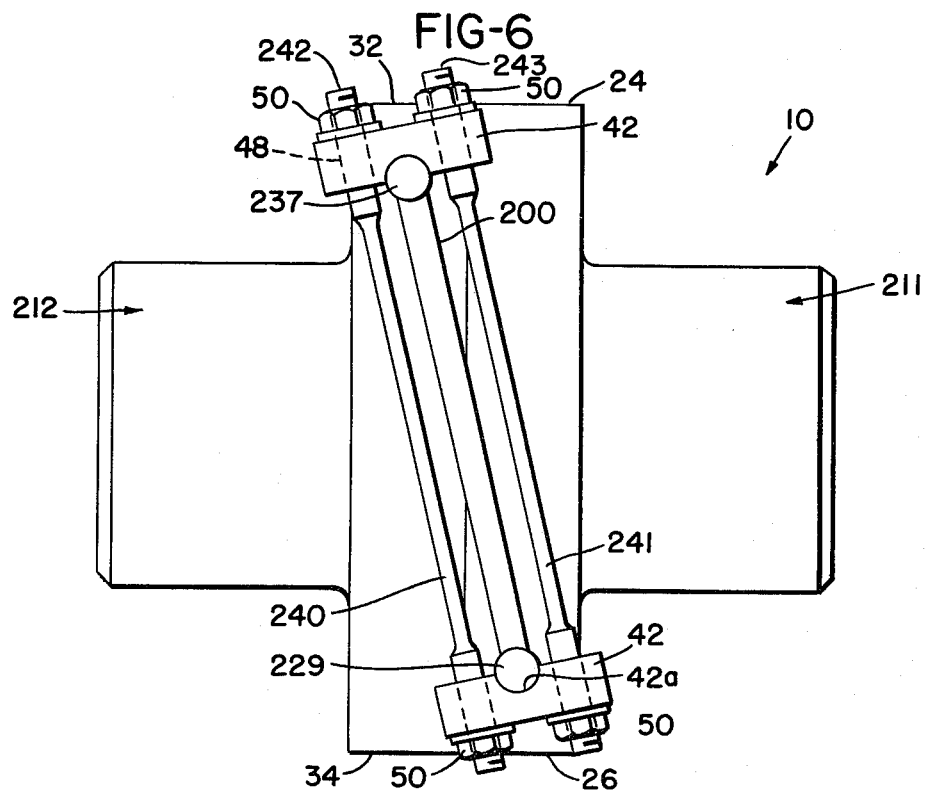
FIG. 6 is a side elevation of a second overload protection coupling illustrating an alternate embodiment of the present invention.

FIG. 6 illustrates one such arrangement of tensile breaking piece and reaction member in which the compression reaction member 200 is located between a projection 229 on the driving member 211 and a projection 237 on the driven member 212, the projections being connected by a pair of tensile breaking pieces 240, 241 extending through bridge pieces 42 and locked in place by nuts 50 on threaded end portions 242, 243 on pieces 240, 241 respectively.

FIG. 7 illustrates an alternative arrangement to that of FIG. 6 in which a tubular reaction member 300 is located between a projection 329 on driving member 311 and a projection 337 on driven member 312. A single tensile breaking piece 305 is telescoped into the reaction member 300. Tensile breaking piece 305 connects projections 329 and 337 in tension by means of nuts 338 retained on threaded end sections 339 extending through holes 340 in projections 329, 337.

In operation of the foregoing couplings the normal torque fluctuation is divided between the tensile breaking pieces and the reaction members in proportion to their respective contributions to the total torsional stiffness of the connection between the coupling driving and driven members as long as the breaking pieces are pre-tensioned against the reaction members. The greater the total torsional stiffness of the connection (by the combination of tensile breaking pieces and reaction members) between the driving and driven members, the smaller will be the resultant strain fluctuation in the breaking pieces as long as the breaking pieces are pre-tensioned against the reaction members. The contribution of the breaking pieces to the total torsional stiffness of the connection is limited by the cross-sectional area dictated by the designed breaking stress and by the length required to ensure substantially tensile loading and to minimize bending stresses in the tensile breaking pieces created by the angular displacement of the projections relative to the axis of rotation of the coupling. Preferably the reaction members are arranged to provide a greater contribution to the total torsional stiffness than the breaking pieces. This may be achieved by adjusting one or a combination of parameters associated with the reaction members such as cross-sectional area, length, effective radius between reaction member and coupling rotational axis or number of reaction members.

Where the torsional stiffness of the reaction members is substantially greater than the torsional stiffness of the breaking pieces, the transmitted torque at which the reaction members would fail under reverse torque loading or reverse rotation would be substantially greater than the transmitted torque at which the tensile breaking pieces would fail when the coupling is rotating and transmitting torque in the normal or forward direction of rotation. Under conditions of torque reversal or reverse rotation the tensile breaking pieces will become loose before the reaction members fail.

The invention, as applied to the couplings illustrated in FIGS. 1 to 7, is generally suitable for transmission systems where breaking pieces are provided to fail in one direction of rotation only. FIGS. 8 and 9 illustrate an adaptation of the coupling in which breaking pieces are provided to fail in both directions of rotation.

The coupling illustrated in FIGS. 8 and 9 comprises a driving member 111 and a driven member 112 spaced by an intermediate coupling member 113. The driving member 111 comprises a hub portion 114 having a bore 115 for connection to a driving shaft not shown, a rectangular flange 116 and a cylindrical portion 117 co-axial with and projecting from face 118 of the rectangular flange 116. The driven member 112 is identical with the driving member 111 and comprises a hub portion 133, a rectangular flange 134 and a cylindrical portion 135 coaxial with and projecting from face 136 of the rectangular flange 134. The intermediate member 113 comprises a rectangular portion 119 having a bore 120 provided with bearings 121 which cooperate with the cylindrical portions 117, 135 respectively on the driving and driven members 111, 112 to provide journal bearing support for the relative rotation of the three members 111, 112 and 113 with respect to each other. Thrust bearings 121a may be provided between the opposing faces of the driving member and intermediate member and the intermediate member and the driven member.

The rectangular flanges 116 of the driving member 111, the driven member 112 and the rectangular portion 119 of the intermediate member 113 are similarly sized and the peripheral faces of each rectangular flange 116, 134 and the rectangular portion 119 are coplanar with each other.

In a manner similar to the coupling illustrated in FIGS. 1 to 5, radial projections 121 on the rectangular flange 116 of the driving member 111 are connected to a first set of radial projections 122 on the intermediate member 113 by pairs of tensile breaking pieces 40, 41 and bridges 42. Similarly, radial projections 140 on the rectangular flange 116 of the driving member 111 are connected to a second set of radial projections 142 on the intermediate member 113 by pairs of reaction members 44, 45 and bridges 46. In addition, projections 123 on the rectangular flange 134 of the driven member 112 are connected to a second set of radial projections 124 on the intermediate member 113 by pairs of tensile breaking pieces 40, 41 and bridges 42. In like manner, radial projections 144 on the flange 134 of the driven member 112 are connected to radial projections 146 on the intermediate member 113 by pairs of reaction members 44, 45 and bridges 46. The pairs of tensile breaking pieces 40, 41 connecting the driving member 111 to the intermediate member 113 are preloaded in tension as in the coupling illustrated in FIGS. 1 to 5 and are arranged to fail when the coupling is transmitting torque in one direction. The pairs of tensile breaking pieces 40, 41 connecting the intermediate member 113 to the driven member 112 are similarly preloaded and arranged to fail when the coupling is transmitting torque in the opposite direction.

FIG. 10 illustrates a coupling having input-output elements 11, 12 like the ones shown in FIG. 1. However, a different breaking link assembly 400 is fitted over pins 29, 37. Assembly 400 comprises first and second ridged links 402, 404 having holes 406, 408 which are received over pins 29, 37 respectively. Links 402, 404 have end faces 410 412 which abut so that the links 402, 404 form the unitary assembly 400. Links 402, 404 have recesses 414, 416 which receive the ends of a tensile breaking piece 418 extending through holes 420, 422 in the links 402, 404 respectively. Nuts 424 at the ends of breaking piece 418 are tightened against shoulders 426, 428 in recesses 414, 416 to place breaking piece 418 in tension.

If desired, additional links 430 may be provided to interconnect pins 28, 36 and 30, 38 to take up any slack between assembly 400 and the pins 29, 37. It should be noted, however, that the links 430 are not absolutely essential to operation of the present invention.

Figure 11:
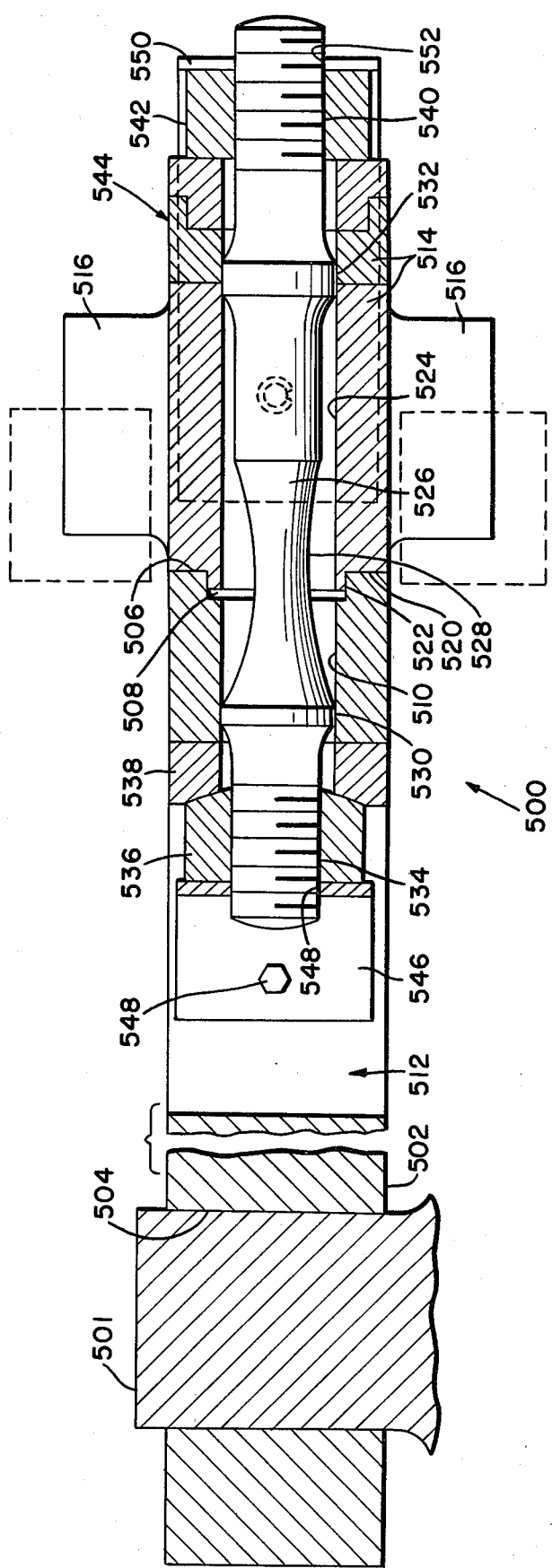
FIG. 11 is a longitudinal section view of an alternate breaking link assembly which embodies the present invention.

FIG. 11 illustrates an example of a production form of breaking link assembly 500 which embodies the present invention. Assembly 500 comprises a first rigid link 502 having an opening 504 to be received over a pin 501 in an overload protection coupling. Link 502 has an end face 506 having a cylindrical 508 recess therein from which a bore 510 extends to a recess 512. A second rigid link 514 has a pair of pins 516 which are adapted to be received in a saddle 518 (shown in dashed lines) on the periphery of an overload coupling. Link 514 has an end face 520 abutting face 506 of link 502 and a cylindrical protrusion 522 piloted in recess 508. A bore 524 extends through link 514 and is coaxial with bore 510 of line 502.

A tensile breaking piece 526 has a necked down portion 528 adjacent end surfaces 506, 520. Piece 526 further comprises lands 530, 532 which are respectively piloted in bores 510, 524. The end of piece 526 which is received in recess 512 has a threaded portion 534 over which a spherical nut washer combination 536, 538 is positioned. The opposite end of piece 526 has a threaded portion 540 which receives a nut 542 sandwiching a hydraulic nut assembly 544 against link 514 to place breaking piece 526 in pre-tension. A U-shaped clip 546 has a slot 549 placed over the threaded portion 534 of piece 526 and is secured to the walls of recess 512 by screws 548. A corresponding U-shaped clip 550 has a hole 552 through which threaded portion 540 extends. Clip 550 is held over the end of assembly 500 by screws 554. The purpose of the clips 546 and 550 are to retain the portions of the tensile breaking piece 526 within the assembly after it is broken.

Although several preferred embodiments of the present invention have been described, it should be apparent to those skilled in the art that it can be practiced in other forms without departing from its spirit and scope.

Having thus described the invention, what is claimed as novel and desired to be secured by Letters Patent of the United States is:

1. An overload protection coupling for limiting the torque transmitted between two elements of a rotating power transmission system, said coupling comprising:
coaxial driving and driven members journaled for rotation relative to one another;
at least one tensile breaking piece positioned on the periphery of the overload protection coupling and comprising an elongated rod whose two ends are connected to respective projections on the driving and driven members, at least one end of the rod being screw threaded and carrying an adjustable nut enabling the projections on the driving and driven members to be displaced towards one another thereby urging relative rotation in a first direction; and,
a pretension means also positioned on the periphery of the overload protection coupling and comprising a tube disposed around each elongated rod and whose two ends abut the projections on the driving and driven members respectively to resist said displacement of the projections upon tightening of said adjustable nut thereby placing said tube in compression and pretension said tensile breaking piece up to a given level which is approximately equivalent to the maximum torque transmitted by said coupling.

* * * * *